United States Patent
Haustein et al.

(10) Patent No.: US 8,745,027 B1
(45) Date of Patent: Jun. 3, 2014

(54) JSLAYOUT CASCADING STYLE SHEETS OPTIMIZATION

(75) Inventors: Stefan Haustein, Zurich (CH); Constantinos Michael, New York, NY (US); Tobias Boonstoppel, New York, NY (US); Steffen Meschkat, Zurich (CH)

(73) Assignee: Google Inc., Mountain View, CA (US)

( * ) Notice: Subject to any disclaimer, the term of this patent is extended or adjusted under 35 U.S.C. 154(b) by 277 days.

(21) Appl. No.: 13/407,431

(22) Filed: Feb. 28, 2012

Related U.S. Application Data (60) Provisional application No. 61/474,046, filed on Apr. 11, 2011.

(51) Int. Cl.
G06F 17/30 (2006.01)
G06F 17/24 (2006.01)

(52) U.S. Cl.
USPC ........... 707/708; 707/755; 707/797; 715/200; 715/205; 715/235

(58) Field of Classification Search
USPC .......... 707/708, 755, 797, 828, 829; 715/200, 715/205, 234, 235
See application file for complete search history.

(56) References Cited

U.S. PATENT DOCUMENTS

| | | |
|---|---|---|
| 6,263,352 B1 | 7/2001 | Cohen |
| 6,738,804 B1 | 5/2004 | Lo |
| 6,938,205 B1 | 8/2005 | Hanson et al. |
| 6,981,212 B1 | 12/2005 | Claussen et al. |
| 7,093,193 B1 | 8/2006 | Goldberg |
| 7,111,231 B1 | 9/2006 | Huck et al. |
| 7,640,512 B1 | 12/2009 | Appling |
| 7,685,609 B1 | 3/2010 | McLellan |
| 7,698,321 B2 | 4/2010 | Hackworth |
| 7,844,894 B2 | 11/2010 | Khopkar et al. |
| 7,958,232 B1 | 6/2011 | Colton et al. |
| 2002/0188631 A1 | 12/2002 | Tiemann et al. |
| 2003/0221184 A1 | 11/2003 | Gunjal et al. |
| 2004/0111671 A1 | 6/2004 | Lu et al. |
| 2004/0187080 A1 | 9/2004 | Brooke et al. |
| 2004/0199497 A1 | 10/2004 | Timmons |
| 2005/0060317 A1 | 3/2005 | Lott et al. |

(Continued)

OTHER PUBLICATIONS

"HSP/EzStor Tutorial," http://www.eztoolssoftware.com/tutorials/hsp/hsphowto1.htm, archived at waybackmachine.com, EzTools Software, Copyright 2003, 8 pages (as Published on Jun. 3, 2009).

(Continued)

*Primary Examiner* — Cheryl Lewis
(74) *Attorney, Agent, or Firm* — Dority & Manning, P.A.

(57) ABSTRACT

A system, method and a computer-readable medium for optimizing cascading style sheet (CSS) rules. The system includes a parser, an optimizer and a compiler. The parser is configured to generate a template tree and a CSS tree. The template tree is associated with a template file that includes one or more templates. The CSS tree is associated with a CSS file that includes one or more CSS rules. The optimizer is configured to traverse the template tree and the CSS tree, and identify each node in the template tree that has a reference to a CSS node in the CSS tree. When the reference exists, optimizer retrieves a CSS rule from the CSS node and appends the CSS rule to the node in the template tree. The compiler compiles the appended template tree.

19 Claims, 7 Drawing Sheets

(56) References Cited

U.S. PATENT DOCUMENTS

| | | | |
|---|---|---|---|
| 2005/0289178 | A1 | 12/2005 | Angus |
| 2006/0107206 | A1 | 5/2006 | Koskimies |
| 2006/0212804 | A1 | 9/2006 | Jackson et al. |
| 2006/0242575 | A1 | 10/2006 | Winser |
| 2007/0033280 | A1 | 2/2007 | Popp et al. |
| 2007/0050407 | A1 | 3/2007 | Chen et al. |
| 2007/0078810 | A1 | 4/2007 | Hackworth |
| 2007/0233902 | A1 | 10/2007 | Trefler et al. |
| 2008/0028302 | A1* | 1/2008 | Meschkat ............... 715/255 |
| 2008/0040653 | A1 | 2/2008 | Levine |
| 2008/0077653 | A1 | 3/2008 | Morris |
| 2008/0133722 | A1 | 6/2008 | Ramasundaram et al. |
| 2008/0275951 | A1 | 11/2008 | Hind et al. |
| 2009/0019386 | A1 | 1/2009 | Sweetland et al. |
| 2009/0063499 | A1 | 3/2009 | Koinuma et al. |
| 2010/0037150 | A1 | 2/2010 | Sawant |
| 2010/0058467 | A1 | 3/2010 | Ivory et al. |
| 2010/0070566 | A1 | 3/2010 | Vandewalle |
| 2010/0306738 | A1 | 12/2010 | Verma et al. |
| 2011/0295979 | A1* | 12/2011 | Alstad et al. ............. 709/219 |
| 2012/0110437 | A1* | 5/2012 | Pan et al. ................ 715/235 |
| 2012/0173967 | A1* | 7/2012 | Lillesveen .............. 715/235 |
| 2012/0324422 | A1* | 12/2012 | Chartier et al. .......... 717/109 |

OTHER PUBLICATIONS

"Jstemplates: Quick example," accessed at http://code.google.com/p/google-jstemplate/source/browsel?r=10, 71 pages (Aug. 19, 2008).

"gooogle-jstemplate—Revision 10: / trunk", discloses a listing of source code files for jstemplate, accessed at http://google-jstemplate.googlecode.com/svn/trunk, accessed on Dec. 5, 2011, 1 page.

"Open HTML from Kindle file systemw/ browser," MobileRead Forums, MobileRead.com, discussion extending from May 1, 2009 to May 3, 2009, accessed at http://www.mobileread.com/forums/printthead.php?s=287962ca817c56df47bd0a254ba201f6&t=45969, accessed on Jul. 16, 2012.

"Possible to Load an Array from a File?—comp.lang.javascript," Google Groups, discussion extending from Nov. 15, 2002 to Nov. 17, 2002, accessed at https://groups.google.com/group/comp.lang.javascript!browse_thread/thread/ac4fc6ff989fbe58?hl=en&noredirect=true&pli=1, accessed on Jul. 11, 2012, 4 pages.

Bernstein, Mark, "Shadows In The Cave: hypertext transformations," in *Journal of Digital Information*, vol. 10 No. 3, University of Texas Digital Library (TDL), 10 pages (published 2009).

Edwards, Dean, "How to Load and Parse XML Data Without ActiveX," accessed at http://dean.edwards.name/weblog/2006/04/easyxml/, accessed on May 30, 2012, 6 pages (published Apr. 2006).

Goodman, Brett, "Client-side ASP scripting with HTML Scripting Pages," ASP Free-Programming Tutorials and News, accessed at http://www.aspfree.com/c/a/ASP/Clientside-ASP-scripting-with-HTML-Scripting-Pages/, accessed on Feb. 9, 2012, 4 pages (published Jan. 1, 2003).

Hoffman, Thad, "Using XML Data Islands in Mozilla," http://www.mozilla.org/xmlextras/xm ldataislands/, The Mozilla Organization, archived at waybackmachine.com, 19 pages (as Published on Sep. 9, 2004).

Jacobs, James Q., "XML Data Binding," accessed at http://www.jqjacobs.net.web/xml/xml_data_binding.html, accessed on Feb. 12, 2012, 3 pages (published 2004).

Kaur, Gurpreet and Mohammad, Muztaba Fuad, "An Evaluation of Protocol Buffer," in *Proceedings of the IEEE SoutheastCon 2010*, IEEE, pp. 459-462 (published 2010).

Kolbitsch, Josef and Maurer, Hermann, "Transclusions in an HTML-Based Environment," in *Journal of Computing and Information Technology* ("*CIT*"), vol. 14, No. 2, pp. 161-174 (published 2006).

Meschkat, Steffen, "Simple and robust browswer side template processing for Ajax based web applications," *Proceedings of the 17th International World Wide Web Conference* ("*WWW 2008*"), 7 pages (published Apr. 2008).

Meschkat, Steffen, "jsevalcontext.js", source code file accessed at http://google-jstemplate.googlecode.com/svn/trunk/jsevalcontext.js, accessed on Dec. 5, 2011, Copyright 2006, Google Inc., 6 pages.

Meschkat, Steffen, "jstemplate.js," source code file accessed at http://google-jstemplate.googlecode.com/svn/trunk, accessed on Dec. 5, 2011, Google Inc., Copyright 2006, 13 pages.

Meschkat, Steffen, "jstemplate_test.js", source code file accessed at http://google-jstemplate.googlecode.com/svn/trunk/jstemplate_test.js, accessed on Dec. 5, 2011, Google Inc., Copyright 2006, 5 pages.

Meschkat, Steffen, "util.js", source code file accessed at http://google-jstemplate.googlecode.com/svn/trunk/util.js, accessed on Dec. 5, 2011, Google Inc., Copyright 2006, 6 pages.

McFarlane, Nigel "Make Data Islands Work in All Browswers," http://www.devx.com/webdev/Article/28898, archived at waybackmachine.com, 9 pages (as published on Feb. 5, 2006).

Nelson, Theodor Holm et al., "Back to the Future: Hypertext the Way It Used to Be," in *Proceedings of the Eighteenth Conference on Hypertext and Hypermedia* ("*HT '07*"), Association for Computing Machinery (ACM), pp. 227-228 (published 2007).

Sivonen, Henri et al., "Assembling Web pages Using Document Trees," http://hsinoven.iki.fi/cms/te/, archived at waybackmachine.com, 28 pages (as published on Apr. 3, 2004).

Stoker, David, "Toucan: A Configurable Web Site Maintenance Tool," Dissertation, University of Sheffield, 44 pages (dated May 11, 2001).

Varda, Kenton, "Protocol Buffers: Google's Data Interchange Format," Open source at Google, accessed at http://google-opensource.blogspot.com/2008/07/protocol-buffers-googles-data.html, accessed on Dec. 5, 2011, 13 pages (published Jul. 7, 2008).

Wisman, Raymond, "Client-side XML," http://homepages.ius.edu/rwisman/n341/htmi/XML.htm, archived at waybackmachine.com, 6 pages (as published on Jun. 6, 2008).

Co-Pending U.S. Appl. No. 13/253,696, Meschkat et al., filed Oct. 5, 2011 (not published).

Office Action mailed Dec. 12, 2011 in U.S. Appl. No. 13/253,696, Meschkat et al., filed Oct. 5, 2011, 11 pages.

Office Action mailed Jun. 11, 2012 in U.S. Appl. No. 13/253,696, Meschkat at al., filed Oct. 5, 2011, 16 pages.

Co-Pending U.S. Appl. No. 13/253,663, Michael et al., filed Oct. 5, 2011 (not published).

Office Action mailed Dec. 16, 2011 in U.S. Appl. No. 13/253,663, Michael et al., filed Oct. 5, 2011, 11 pages.

Office Action mailed May 25, 2012 in U.S. Appl. No. 13/253,663, Michael et al., filed Oct. 5, 2011, 12 pages.

Co-Pending U.S. Appl. No. 13/253,780, Michael et al., filed Oct. 5, 2011 (not published).

Office Action mailed Dec. 20, 2011 in U.S. Appl. No. 13/253,780, Michael et al., filed Oct. 5, 2011, 11 pages.

Office Action mailed Jun. 11, 2012 in U.S. Appl. No. 13/253,780, Michael et al., filed Oct. 5, 2011, 13 pages.

Co-Pending U.S. Appl. No. 13/253,814, Michael et al., filed Oct. 5, 2011 (not published).

Office Action mailed Feb. 21, 2012 in U.S. Appl. No. 13/253,814, Michael et al., filed Oct. 5, 2011, 8 pages.

Office Action mailed Jul. 19, 2012 in U.S. appl. No. 13/253,814, Michael et al., filed Oct. 5, 2011, 9 pages.

Co-Pending U.S. Appl. No. 13/245,823, Michael et al., filed on Sep. 26, 2011 (not published).

Office Action mailed Nov. 17, 2011 in U.S. Appl. No. 13/245,823, Michael et al., filed Sep. 26, 2011, 13 pages.

Office Action mailed Apr. 19, 2012 in U.S. Appl. No. 13/245,823, Michael et al., filed Sep. 26, 2011, 11 pages.

Co-pending U.S. Appl. No. 13/245,831, Michael et al., filed Sep. 26, 2011 (not published).

Office Action mailed Dec. 9, 2011 in U.S. Appl. No. 13/245,831, Michael et al., filed Sep. 26, 2011, 14 pages.

Office Action mailed Apr. 4, 2012 in U.S. Appl. No. 13/245,831, Michael at al., filed Sep. 26, 2011, 23 pages.

* cited by examiner

JSLAYOUT CASCADING STYLE SHEETS OPTIMIZATION

This application claims the benefit of U.S. Provisional Application No. 61/474,046, filed on Apr. 11, 2011 and is incorporated by reference in its entirety.

BACKGROUND

The emergence and development of computer networks and protocols, such as the Internet and the World Wide Web (or simply "web" or "Web"), allow a user to use their computing devices to download and display a webpage. When a webpage includes many different sections or identical sections are included in different webpages, those sections may be represented using templates.

Often each template accesses a unique cascading style sheets (CSS) file that includes CSS rules. Conventional template processing systems link the contents of the CSS file in the HTML output stream even when only a subset of the CSS rules included in the CSS file are used.

BRIEF SUMMARY

A system, method and a computer-readable medium for optimizing cascading style sheet (CSS) rules. The system includes a parser, an optimizer and a compiler. The parser is configured to generate a template tree and a CSS tree. The template tree is, associated with a template file that includes one or more templates. The CSS tree is associated with a CSS file that includes one or more CSS rules. The optimizer is configured to traverse the template tree and the CSS tree, and identify each node in the template tree that has a reference to one or more CSS nodes in the CSS tree. When the reference exists, the optimizer reconstructs a CSS rule from the one or more CSS nodes and appends the CSS rule to the node in the template tree. The compiler compiles the appended template tree.

In another embodiment, a system, method and a computer-readable medium for optimizing cascading style sheet (CSS) rules are provided. The system includes a communication interface and interpreter. The communication interface receives a message requesting a webpage and sends a response message, the response message including an output stream that is displayed as the webpage. The interpreter collects CSS rules included in a compiled template tree into a style element. The interpreter also excludes CSS rules from the style element according to predefined criteria. The interpreter also inserts the style element in the output stream and communicates the output stream to the communication interface.

Further features and advantages of the present invention, as well as the structure and operation of various embodiments thereof, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION

While the present invention is described herein with reference to illustrative embodiments for particular applications, it should be understood that the invention is not limited thereto. Those skilled in the art with access to the teachings herein will recognize additional modifications, applications, and embodiments within the scope thereof and additional fields in which the invention would be of significant utility.

Unlike conventional template processing systems that link the contents of the CSS file in the HTML output stream, even when only a subset of the CSS rules included in the CSS file is used, the template processing system described herein includes only the CSS rules required for rendering the webpage. As a result, the template processing system described herein reduces the amount of data included in the output stream and increases the efficiency of transferring the data stream across the network and the speed for rendering a webpage.

Figure 1:
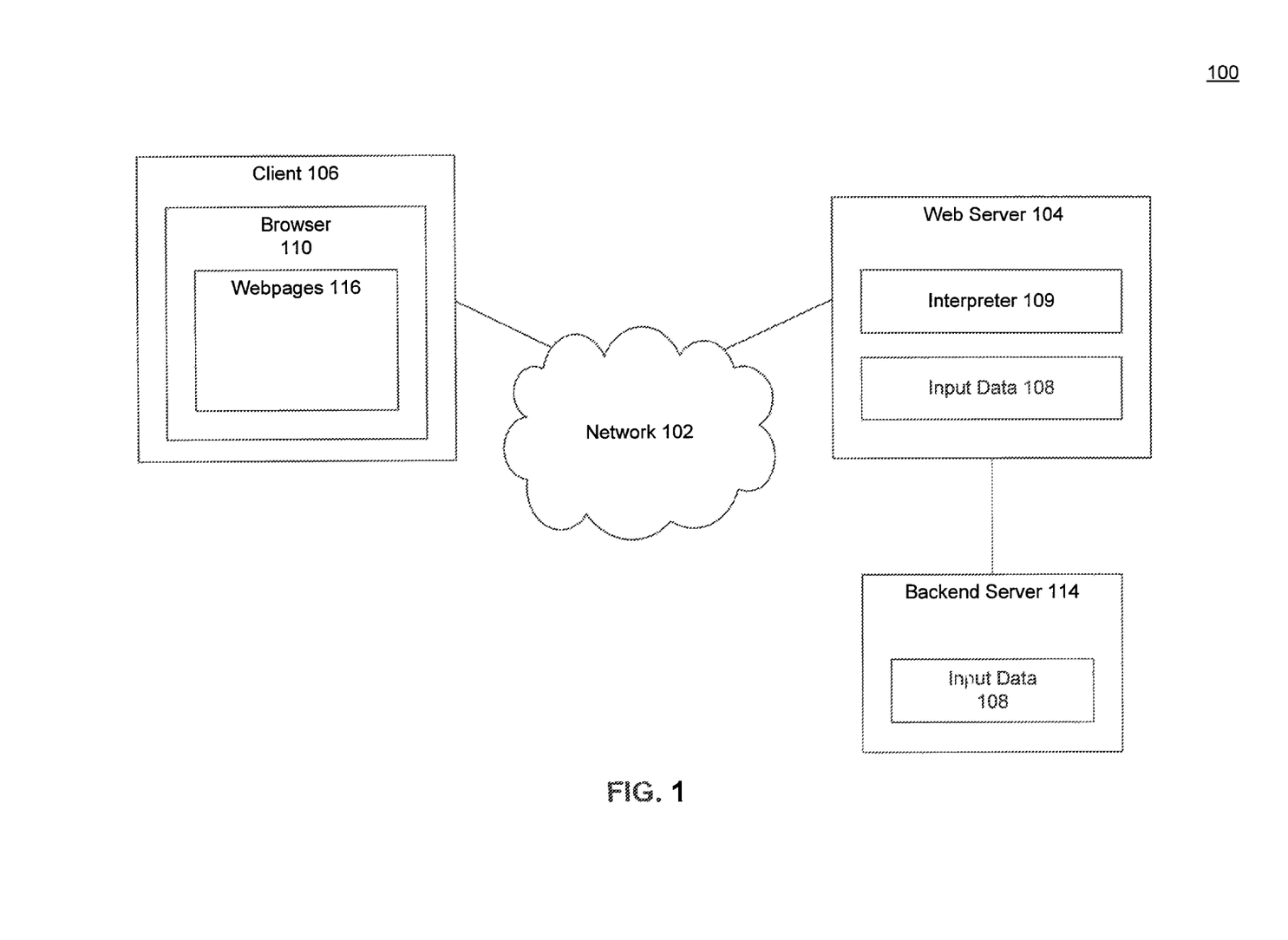
FIG. 1 is a block diagram of an exemplary system of an environment capable of generating a valid HTML document.

FIG. 1 is a block diagram of an exemplary system 100 of an environment capable of generating webpages. System 100 includes a network 102, a web server 104 and a client 106. Network 102 connects client 106 and web server 104. System 100 may include many thousands of web servers 104 and clients 106.

Network 102 may be any network or combination of networks that can carry data communication. Such a network 102 may include, but is not limited to, a local area network, metropolitan area network, and/or wide area network such as the Internet. Network 102 can support protocols and technology including, but not limited to, World Wide Web protocols and/or services. Intermediate web servers, gateways, or other servers may be provided between components of the system shown in FIG. 1 depending upon a particular application or environment.

Web server 104 is an electronic device capable of sending, receiving and storing resources. Resources can be provided over network 102. Resources include data inserted into hypertext markup language (HTML) pages, word processing documents, portable document format (PDF) documents, images, video, and feed sources, to name only a few. Web server 104 also includes input data 108. Input data 108 is data content that client 106 requests from web server 104.

In an embodiment, web server 104 includes an interpreter 109. Interpreter 109 executes templates compiled and template tree that are built by the template building module (described below). When web server 104 receives a hypertext transfer protocol (HTTP) request from client 106, web server 104 uses interpreter 109 to generate an output stream that includes the layout of webpage 116 and input data 108. In an embodiment, output stream 304 is an HTML output stream.

Backend server 114 is a database or a storage repository that stores input data 108. In an embodiment, web server 104 retrieves input data from web server 104 when it receives an HTTP request from client 106. Web server 104 may use network 102 to retrieve input data 108 from backend server 114.

Client 106 is an electronic computing device capable of requesting and receiving resources over network 102. Example clients 106 are personal computers, mobile communication devices, (e.g. smart phones, tablet computing devices, notebooks), set-top boxes, game-console embedded systems, and other devices that can send and receive input data 108 included in an output stream over network 102. To display input data 108, client 106 may execute an application, such as a browser 110.

Browser 110 is an application that executes on client 106. Browser 110 displays HTML documents as webpages 116.

Figure 2:
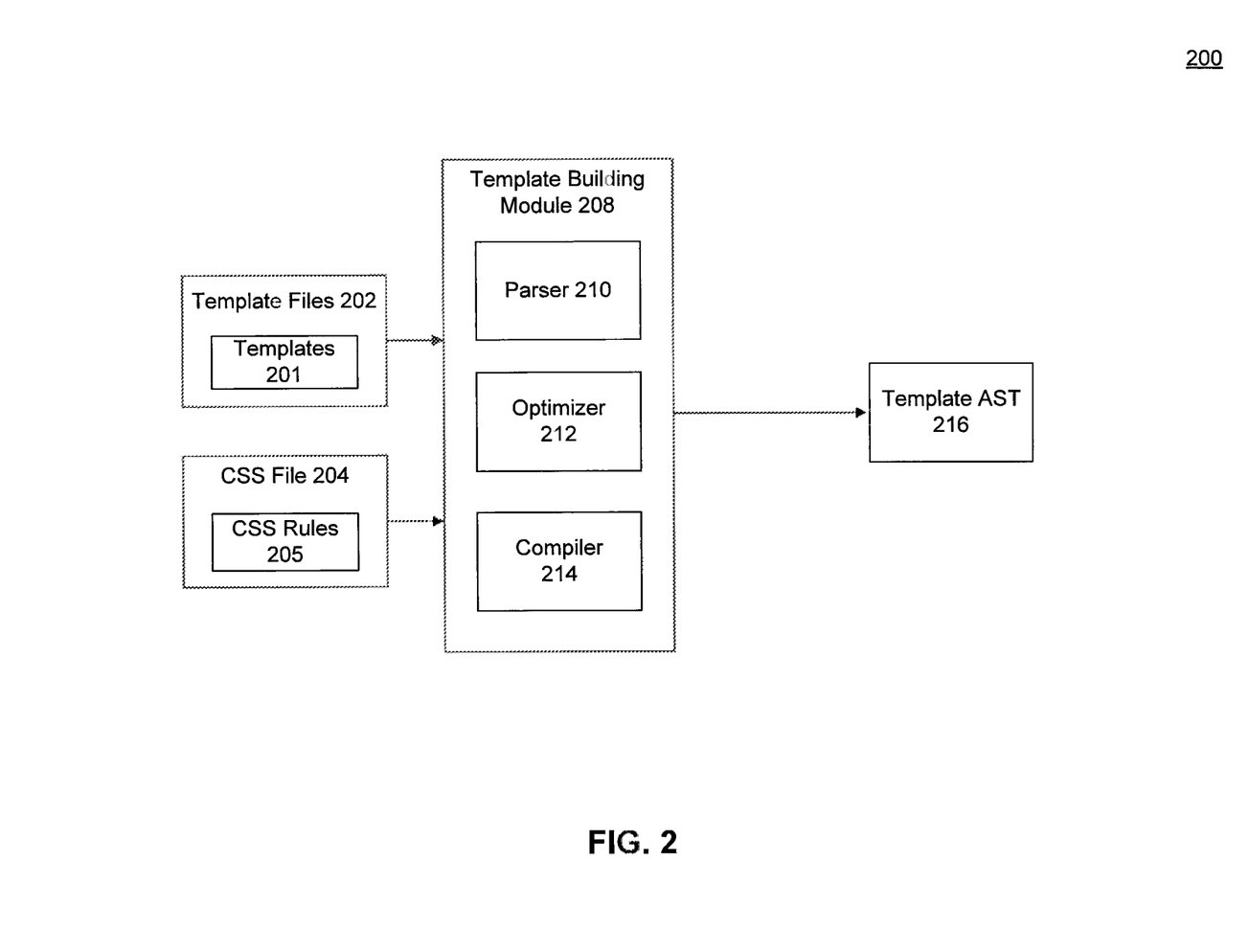
FIG. 2 is a block diagram of an exemplary embodiment of a template building module.

FIG. 2 is a block diagram of an exemplary embodiment 200 of a template building module. Template building module 208 may be hosted on any computing device that a developer uses to build and design templates. Template building module 208 may be a component of a template processing system (not shown). Unlike conventional template processing systems, the template processing system that includes a template building module 208 decouples the template building and compilation process from the rendering process. During the building and compilation process, template building module 208 creates a template abstract syntax tree (AST) 216. Template AST 216 includes template credentials, such as CSS rules included in the template as well as HTML text associated with the template.

Template building module 208 accesses template files 202 and CSS files 204. Template files 202 include templates 201. Template 201 typically includes formatted code, such as HTML markup code, processing instructions, expressions and custom attributes that are interpreted by template building module 208. Template 201 may be statically modified by being loaded into an HTML editor or browser 110 prior to the building and compilation process.

Example template file 202, such as "results.html" is below:

```
<html jsimport="template/prototemplate/jslayout/examples/snippet/result.proto">
  <link rel="stylesheet" type="style/css" href="stylesheet.css">
  <div jstemplate="result_template; result_message:maps_jslayout.Result">
    Snippets:
    <div jsvars="total:size('result_message.line_snippet_array')"
        jsselect="snippet, i: result_message.line_snippet_array">
      <span class="snippet-text" jscontent="'snippet' + (1 + i) + 'of ' + total">
        Text here is replaced with "snippet X of Y"
      </span>
      <div use="line_snippet_file.html#line_snippet_template">
        Text here is replaced with transcluded and processed template.
      </div>
    </div>
  </div>
</html>
```

CSS files 204 include CSS rules 205, and may also include other data. CSS rules 205 communicate to browser 110 the format for displaying webpages 116. For example CSS rules 205 may indicate the size and the type of a font, the margins, etc. of template 201 included in webpage 116. Example CCS file 204, such as "stylesheets.css" is below:

.snippet-text{font-weight: bold;} h1{font size:24pt;} div{margin: 12px;}

Example CCS rules 205 included in ""stylesheets.css" are ".snippet-text{font-weight: bold;}", "h1{font size:24pt;}" and "div{margin: 12px;}"

CSS rule 205 includes a declaration and a selector. In an embodiment, a declaration is included inside the curly brackets and defines the behavior of the HTML element in template 201 that applies CSS rule 205. A selector identifies CSS rule 205 in template 201. Example selectors included in "stylesheets.css"" are ".snippet-text", "h1" and "div".

In an embodiment, the "." included in the selector, such as ".snippet-text" is an identifier for CSS rule 205. The identifier indicates that CSS rule 205 is triggered by a class attribute in template file 202 that has the same name as the selector. For example element "<span class="snippet-text" jscontent="'snippet'+(1+i)+'of'+total">" in template file "Result.html", triggers CSS rule 205 "".snippet-text {font-weight: bold;}"

In an embodiment, a "link" element in each template file 201 included in template file 202 declares CSS file 204. In another embodiment, a "link" element may reference a CSS file 204 for all templates 201 in template file 202. For example, a <link rel="stylesheet" type="style/css" href="stylesheet.css"> element included in template file "Results.html" includes CSS file "stylesheets.css." After template file 202 declares CSS file 204, templates 201 in template file 202 may access CSS rules 205 included in CSS file 204.

Template building module 208 includes a parser 210, an optimizer 212 and compiler 214. Parser 210 parses the HTML syntax in each template 201 included in template file 202, verifies data-types of the input parameters and paths to external files declared in template 201, such as, for example, CSS file 204.

Parser 210 also determines whether template 201 is a transcluding template. Template transclusion occurs when a content of an element, such as an HTML element in one template, replaces content of an element from another template. When parser 210 identifies a transcluding template, parser 210 verifies that the transcluded template file exists and is accessible to the transcluding template. Parser 210 also determines whether the data type of the parameter in the transcluding template that receives the transcluded template matches the data type of the transcluded template. Template transclusion is described in detail in a non-provisional U.S. patent application Ser. No. 13/253,780 and in a non-provisional U.S. patent application Ser. No. 13/253,696 and is incorporated by reference in its entirety.

Parser 210 also generates a template tree representation of template file 202.

In an embodiment, the tree representation is an abstract syntax tree (AST). In one embodiment, AST may be represented in a text file. In another embodiment, AST may be a compiled, binary representation. In an embodiment, AST may be represented as a protocol buffer message. A person skilled in the art will appreciate that protocol buffer messages are structures that serialize structured data. Abstract template tree representation of the templates and protocol buffer messages are described in detail in a non-provisional U.S. patent application Ser. No. 13/253,780 which is incorporated by reference in its entirety.

When parser 210 identifies that transclusion occurs in template files 202, parser 210 generates a template AST 216 for the transcluding template and the transcluded template.

Parser 210 also parses CSS files 204. For example, parser 210 parses CSS rules 205 in CCS file 204 into a CSS AST. In a non-limiting embodiment, the edges of CSS tree represent selectors of a particular CSS rule 205. The nodes in CSS tree represent declarations of particular CSS rules 205 as property-value pairs. In an embodiment, the nodes in CSS AST are associated with the nodes in template AST 216.

In an embodiment, optimizer 212 optimizes expressions and processing instructions in templates 201. Optimizer 212 determines CSS rules 205 that are included in template 201 and attaches CSS rules 205 to template AST 216. For example, optimizer 212 traverses template AST 216 and CSS AST in parallel. When optimizer 212 identifies a node in template AST 216 that references CSS rule 205, optimizer 212 traverses CSS AST and identifies the node that includes a CSS rule 205. Once the node with CSS rule 205 is identified, optimizer 212 attaches CSS rule 205 to template AST 216. In one embodiment, optimizer 212 may create a node in template AST 216 that includes the associated CSS rule 205. In another embodiment, optimizer 212 may copy CSS rule 205 into a node in template AST 216 that includes a reference to CSS rule 205.

In an embodiment, optimizer 212 traverses template AST 216 and CSS AST in parallel. Each time optimizer 212 accesses a node in template AST 216, optimizer 212 marks its position in the CSS AST. When optimizer 212 returns to traversing CSS AST, optimizer 212 begins the traversal from the marked position. As a result, optimizer 212 reduces the number of times it needs to traverse template AST 216 and the CSS AST to identify CSS rules 205 that are included in template 201.

For example, template file "results.html" described above includes two CSS rules 205 declared in CSS file "stylesheet.css." As described herein, CSS file "stylesheets.css" includes three CSS rules 205. After optimizer 212 traverses template AST 216 of the template file "results.html" and CSS AST of "stylesheets.css", optimizer 212 appends the CSS rules "div" and "snippet.text" to template AST 216.

Because CSS rules 205 are attached to template AST 216, each template 201 includes CSS rules 205 associated with that template and does not require the complete CSS file 204. For example, in transclusion, where the content of the transcluded template is inserted into the content of the transcluding template, each template is displayed with its own set of CSS rules 205.

Compiler 214 compiles the AST template into a binary template AST 216. Binary template AST 216 includes template AST and appended CSS rules 205.

Once compiled, binary AST template 216 is uploaded onto a web server 104.

Figure 3:
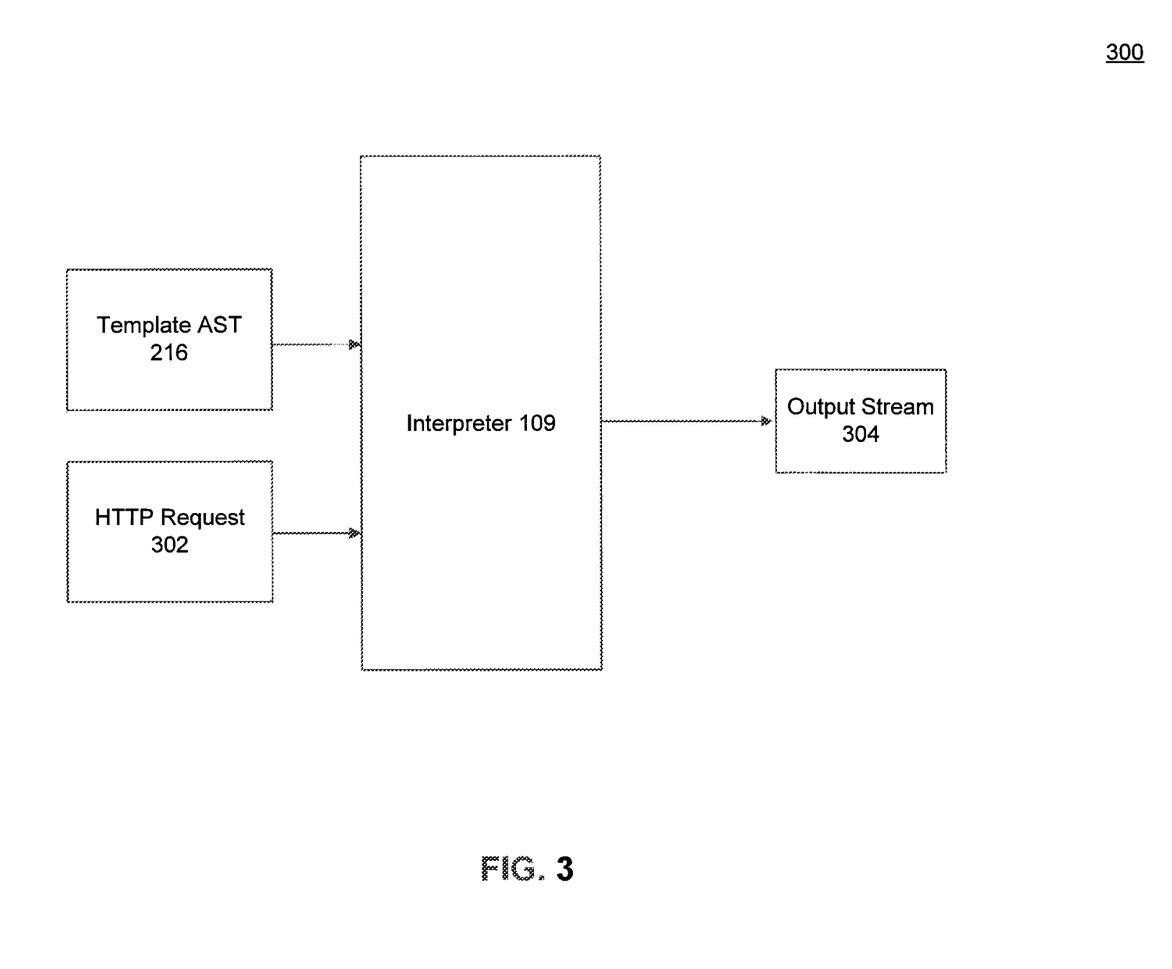
FIG. 3 is a block diagram of an exemplary embodiment of an interpreter.

FIG. 3 is a block diagram 300 of an interpreter generating a valid HTML document using the generated AST template. Block diagram 300 includes interpreter 109, an HTTP request 302, template AST 216 and output stream 304.

When web server 104 receives HTTP request 302 for webpage 116, web server 104 passes HTTP request 302 to interpreter 109. Interpreter 109 begins to generate output stream 304. Output stream 304 is included in the HTTP response message that web server 104 sends to client 106. In an embodiment, output stream 304 includes HTML that browser 110 uses to display templates 201 and input data 108.

Interpreter 109 requests input data 108. In one embodiment, interpreter 109 requests input data 108 stored on web server 104. In another embodiment, interpreter 109 requests input data 108 from backend server 114. Interpreter 109 traverses AST template 216 and generates output stream 304 by combining HTML syntax stored in the nodes of AST template 216 with input data 108.

When interpreter 109 traverses AST template 216, interpreter 109 aggregates CSS rules 205 attached to AST template 216 into one HTML element, such as, for example, an HTML <style> element. In an embodiment, there is one <style> element for each template 201. After interpreter 109 generates the <style> element, interpreter 109 inserts the <style> element into output stream 304 so that CSS rules 205 included in <style> element apply to the content displayed by the HTML included in template 201.

In an embodiment, interpreter 109 excludes repetitive CSS rales 205 from the <style> element. The exclusion reduces the amount of repetitive HTML parameters included in output stream 304. For example, when interpreter 109 determines that two CSS rules 205, such as "h1{font size:24pt;}" described above, are included a <style> element, interpreter 109 eliminates one of the CSS rules 205.

When interpreter 109 processes transclusions, interpreter 109 includes CSS rules 205 associated with the transcluded template inside the transcluding template. This allows browser 110 to display the transcluded and transcluding template with their respective CSS rules 205. For example, interpreter 109 inserts the <style> element into the sections of output stream 304 for transcluding and transcluded template such that CSS rules 205 apply to the respective template.

When generating output stream 304 for transclusions, interpreter 109 excludes CSS rules 205 included in template AST 216 of the transcluded template using predetermined criteria. In one embodiment, interpreter 109 excludes CSS rules 205 from the <style> element associated with the transcluded template when CSS rules 205 apply to the HTML elements that are outside of the transcluded template. In another embodiment, interpreter 109 excludes CSS rules 205 that are applied to the transcluded template by the HTML selectors that are included in another section of template file 202.

Moreover, interpreter 109 eliminates the duplicates of CSS rules 205 that are generated by multiple transclusions. For example, identical CSS rules 205 from different transclusions are inserted once into the <style> element. In one example, if the same transcluded template is inserted into the transcluding template multiple times, interpreter 109 generates a single set of CSS rules 205 in the <style> element, and applies the <style> element to the multiple transcluded template instances. In another example, when CSS rules 205 associated with multiple transcluded templates (either in the same or different template files 202) overlap, interpreter 109 includes one set of the overlapping CSS rules 205 in the <style> element.

After interpreter 109 determines CSS rules 205 that are included in the <style> element, interpreter 109 generates output stream 304 that includes templates 201 filled with input data 108. Interpreter 109 also inserts the <style> element with included CSS rules 205 in output stream 304 such that template 201 conforms to the layout specified by CSS rules 205. When interpreter 109 completes generating output stream 304, web server 104 sends output stream to client 106.

Client 106 receives output stream 304 and generates webpage 116. In an embodiment, browser 110 translates output stream 304 into webpage 116 and displays webpage 116 to a user.

Figure 4:
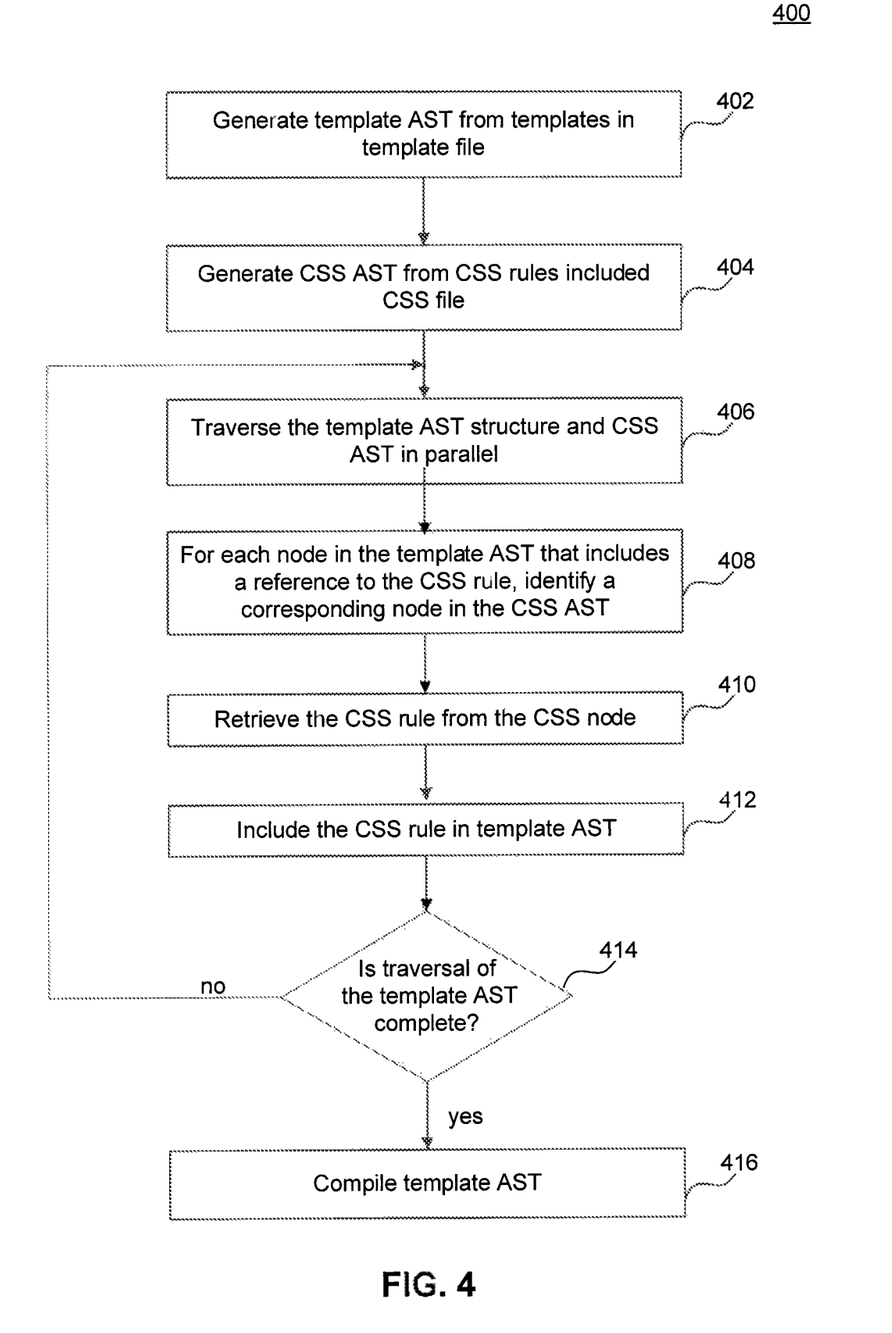
FIG. 4 is a flowchart of a method for generating a template AST that includes CSS rules, according to an embodiment.

FIG. 4 is a flowchart of a method 400 for generating a template AST that includes CSS rules, according to an embodiment. While method 400 is described with respect to the system components for clarity, it is not limited thereto.

At stage 402, a template AST is generated. For example, template building module 208 accesses template file 202. Parser 210 accesses templates 201 included in template file 202 and builds template AST 216 from templates 201.

At stage 404, a CSS AST is generated. For example, parser 210 accesses CSS file 204 and builds CSS AST. As described herein, the nodes of CSS AST include CSS rules 205. In an embodiment, parser 210 generates CSS AST that matches the structure of template AST 216.

At stage 406, a template AST and CSS AST are traversed. For example, optimizer 212 traverses template AST 216 and CSS AST.

At stage 408, optimizer 212 identifies a node in a template AST that includes a reference to a CSS rule. For example, optimizer 212 identifies a node in template AST 216 that includes a reference to CSS rule 205. Once optimizer 212 identifies the relevant node in template AST 216, optimizer 212 accesses the CSS AST and identifies the node in CSS AST that includes CSS rule 205 associated with the relevant node.

At stage 410, a CSS rule is retrieved. For example, optimizer 212 retrieves CSS rule 205 from CSS AST.

At stage 412, a CSS rule is attached to a template AST. For example, optimizer 212 attaches CSS rule 205 to a node in template AST 216 that includes a reference to CSS rule 205.

At stage 414, optimizer determines whether the traversal is complete. For example, optimizer 212 determines whether it completed traversing nodes in template AST. If additional nodes exist, the method proceeds to step 406. Otherwise to step 416.

At stage 416, a template AST is compiled. For example, compiler 214 compiles template AST into a binary that may be processed on web server 104.

Figure 5:
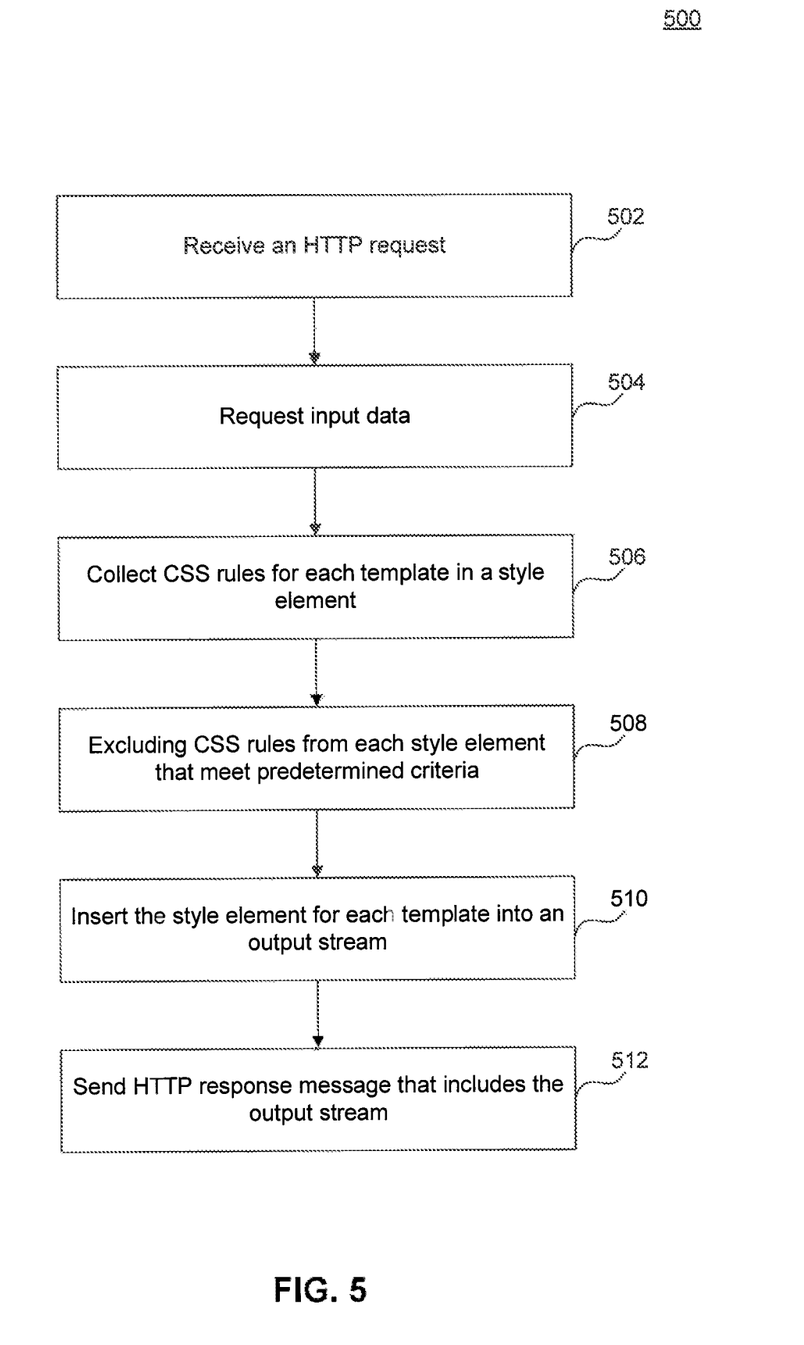
FIG. 5 is a flowchart of a method for generating output stream, according to an embodiment.

FIG. 5 is a flowchart of a method 500 for generating output stream that includes optimized CSS rules, according to an embodiment.

At stage 502, a web server receives a request for a webpage. For example, web server 104 receives an HTTP message for client 106 that requests webpage 116.

At stage 504, web server retrieves input data. For example, web server 104 retrieves input data 108 stored on web server 104 or from backend server 114.

At stage 506, interpreter generates a <style> element for each template that includes CSS rules. For example, interpreter 109 generates a <style> element for each template 201 included in the requested webpage 116 from AST template 216. As described herein, each <style> element includes CSS rules 205 attached to template AST 216.

At stage 508, interpreter excludes CSS rules according to predetermined criteria. For example, interpreter 109 eliminates duplicate CSS rules and overlapping CSS rules from each <style> element as described herein.

At stage 510, interpreter inserts the <style> element into an output stream. For example, interpreter 109 generates output steam that includes templates 201 and input data 108 that is included in templates 201. Interpreter 109 also inserts a <style> element into output stream 304 at a position such that CSS rules 205 included in the <style> element control the layout of associated template 201.

At stage 512, a web server sends an output stream for display to a client. For example, after interpreter 109 completes generating output stream 304, web server 104 sends output stream 304 for display on client 106.

Figure 6:
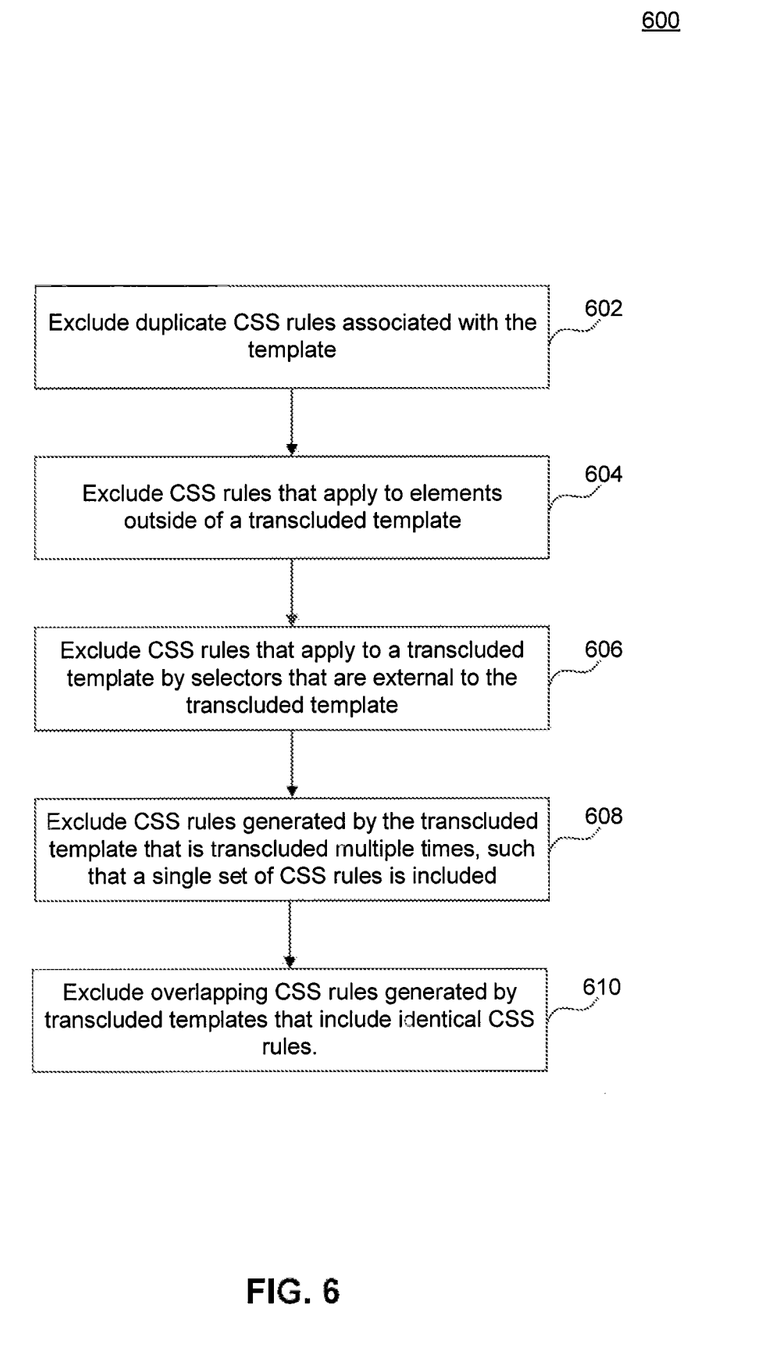
FIG. 6 is a flowchart of a method for eliminating CSS rules, according to an embodiment.

FIG. 6 is a flowchart of a method 600 for eliminating CSS rules, according to an embodiment. A person skilled in the art will appreciate that the criteria for eliminating CSS rules 205 is given by way of example, and not limitation and that other criteria for eliminating duplicate CSS rules 205 may be used.

At stage 602, duplicate CSS rules are excluded. For example, interpreter 109 excludes duplicate CSS rules 205 from the <style> element associated with template 201.

At stage 604, CSS rules that apply to elements outside of the transcluded template are excluded. For example, interpreter 109 does not include CSS rules 205 into the <style> element that exist in template file 202 but apply to elements that are external to the transcluded template.

At stage 606, CSS rules that apply to the transcluded template by external selectors are excluded. For example, interpreter 109 does not include CSS rules 205 in the <style> element that apply to a transcluded template by the HTML selectors external to the transcluded template.

At stage 608, CSS rules that are generated by a repeated transclusion of the same template are excluded. For example, interpreter 109 does not include CSS rules 205 in the <style> element multiple times when the same template 201 is transcluded multiple times.

At stage 610, overlapping CSS rules are excluded. For example, interpreter 109 includes a single set of CSS rules in the <style> element that overlap among multiple transcluded templates.

Figure 7:
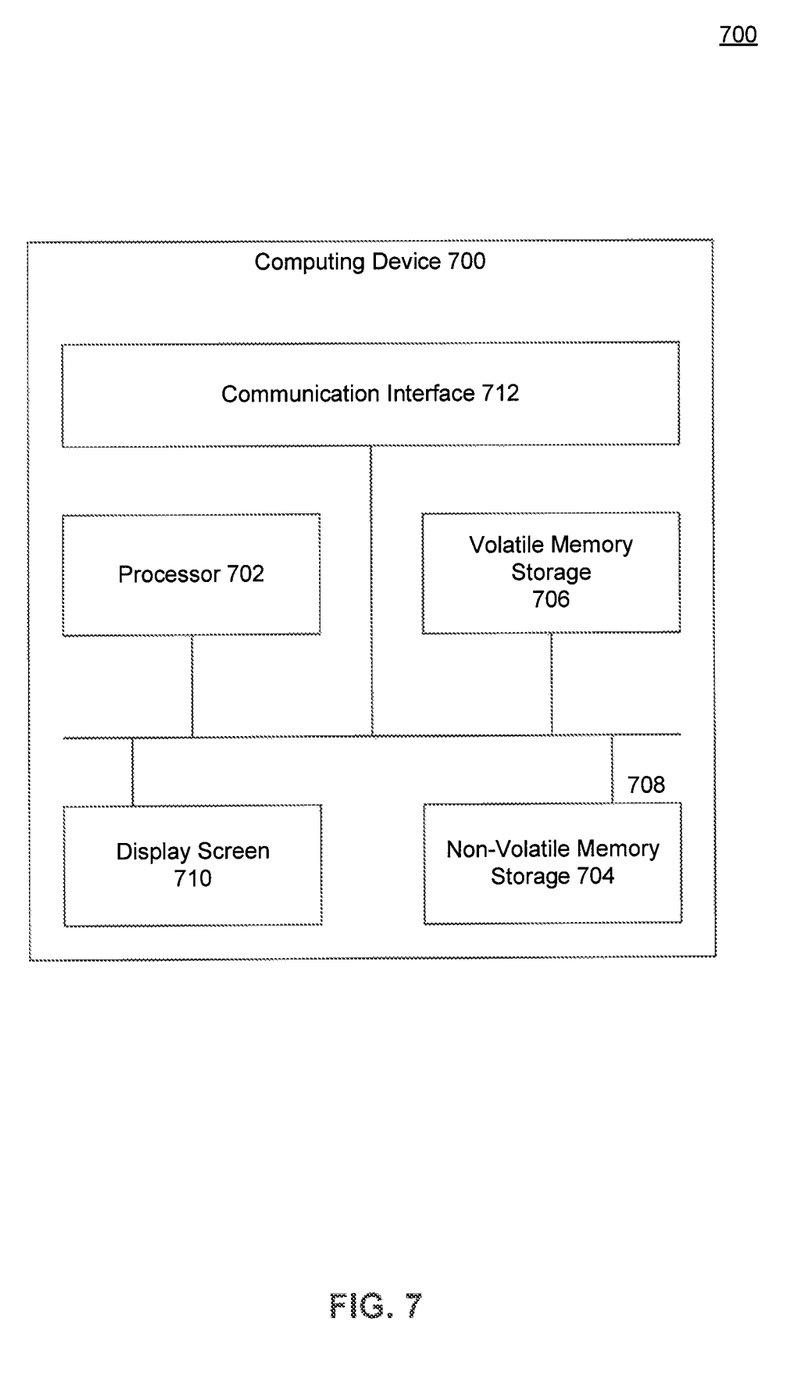
FIG. 7 is a block diagram of an example computer system.

FIG. 7 is an example computer system 700 in which embodiments of the present invention, or portions thereof, may be implemented as computer-readable code. For example, the components or modules of system 100 may be implemented in one or more computer systems 700 using hardware, software, firmware, tangible computer readable media having instructions stored thereon, or a combination thereof and may be implemented in one or more computer systems or other processing systems. Hardware, software, or any combination of such may embody any of the modules and components in FIGS. 1-5.

Web server 104 and client 106 can include one or more computing devices. According to an embodiment, web server 104 and client 106 can include one or more processors 702, one or more non-volatile storage mediums 704, one or more memory devices 706, a communication infrastructure 708, a display screen 710 and a communication interface 712. Processors 702 can include any conventional or special purpose processor, including, but not limited to, digital signal processor (DSP), field programmable gate array (FPGA), and application specific integrated circuit (ASIC). Non-volatile storage 704 can include one or more of a hard disk drive, flash memory, and like devices that can store computer program instructions and data on computer-readable media. One or more of non-volatile storage device 704 can be a removable storage device. Memory devices 706 can include one or more volatile memory devices such as, but not limited to, random access memory. Communication infrastructure 708 can include one or more device interconnection buses such as Ethernet, Peripheral Component Interconnect (PCI), and the like.

Typically, computer instructions executing on web server 104 or client 106 are executed using one or more processors 702 and can be stored in non-volatile storage medium 704 or memory devices 706.

Display screen 710 allows results of the computer operations to be displayed to a user or an application developer.

Communication interface 712 allows software and data to be transferred between computer system 700 and external devices. Communication interface 712 may include a modem, a network interface (such as an Ethernet card), a communications port, a PCMCIA slot and card, or the like. Software and data transferred via communication interface 712 may be in the form of signals, which may be electronic, electromagnetic, optical, or other signals capable of being received by communication interface 712. These signals may be provided to communication interface 712 via a communications path. Communications path carries signals and may be implemented using wire or cable, fiber optics, a phone line, a cellular phone link, an RF link or other communications channels.

Embodiments also may be directed to computer program products comprising software stored on any computer-useable medium. Such software, when executed in one or more data processing device, causes a data processing device(s) to operate as described herein. Embodiments of the invention employ any computer-useable or readable medium. Examples of computer-useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The Summary section may set forth one or more but not all exemplary embodiments as contemplated by the inventor(s), and thus, are not intended to limit the present invention and the appended claims in any way.

The breadth and scope of the present invention should not be limited by any of the above-described exemplary embodiments, but should be defined only in accordance with the following claims and their equivalents.

What is claimed is:

1. A computer-implemented method for a cascading style sheet (CSS) rule optimization, comprising:
   generating, by one or more computing devices, a template tree associated with a template file with a parser, the template file including one or more templates;
   generating, by the one or more computing devices, a CSS tree associated with a CSS file with the parser, the CSS file including at least one or more CSS rules;
   traversing, by the one or more computing devices, the template tree and the CSS tree with an optimizer, wherein the traversing further comprises:
      for each node in the template tree, identifying a reference to one or more CSS nodes in the CSS tree;
      if the reference exists, reconstructing a CSS rule from the one or more CSS nodes;
      appending the CSS rule to the node in the template tree; and
   compiling, by the one or more computing devices, the appended template tree with a compiler.

2. The computer-implemented method of claim 1, wherein the traversing is performed in parallel and further comprises tracking a position of a last traversed node in the CSS tree.

3. The computer-implemented method of claim 1, wherein the CSS tree is an abstract syntax tree (AST).

4. The computer-implemented method of claim 1, wherein the template tree is an AST.

5. The computer-implemented method for a cascading style sheet (CSS) rule optimization, comprising:
   receiving, by one or more computing device, a message requesting a webpage;
   collecting, by the one or more computing devices, one or more CSS rules included in a compiled template tree in a style element, the compiled template tree generated with a parser;
   excluding with an optimizer, by the one or more computing devices, one or more CSS rules from the style element according to a predefined criteria;
   inserting, by the one or more computing devices, the style element in an output stream with a compiler; and
   sending, by the one or more computing devices, a response message, the response message including the output stream that is displayed as the webpage.

6. The computer-implemented method of claim 5, further comprising excluding the duplicate CSS rule.

7. The computer-implemented method of claim 5, further comprising excluding the CSS rule that applies to an element outside of a transcluded template.

8. The computer-implemented method of claim 5, further comprising excluding the CSS rule that applies to a transcluded template by a selector external to the transcluded template.

9. The computer-implemented method of claim 5, further comprising excluding the CSS rule that is transcluded by a transcluded template multiple times.

10. The computer-implemented method of claim 5, further comprising excluding the CSS rule that is included in a plurality of transcluded templates.

11. A system for a cascading style sheet (CSS) rule optimization, comprising:
   a parser configured to:
      generate, by one or more computing device, a template tree associated with a template file, the template file including one or more templates, and
      generate, by the one or more computing device, a CSS tree associated with a CSS file, the CSS file including at least one or more CSS rules;
   an optimizer configured to:
      traverse, by the one or more computing device, the template tree and the CSS tree, wherein the traversing further comprises:
      for each node in the template tree, the optimizer if further configured to:

identify a reference to one or more CSS nodes in the CSS tree;

if the reference exists, reconstructing a CSS rule from the one or more CSS nodes;

append the CSS rule to the node in the template tree; and a compiler configured to compile, by the one or more computing device, the appended template tree.

12. A system for a cascading style sheet (CSS) rule optimization, comprising:

a communication interface configured to:

receive, by one or more computing device, a message requesting a webpage;

send, by the one or more computing device, a response message, the response message including an output stream that is displayed as the webpage;

an interpreter configured to:

collect, by the one or more computing device, one or more CSS rules included in a compiled template tree in a style element, the compiled template tree generated with a parser;

exclude with an optimizer, by the one or more computing device, one or more CSS rules from the style element according to a predefined criteria;

insert, by the one or more computing device, the style element in the output stream with a compiler; and communicate, by the one or more computing device, the output stream to the communication interface.

13. The system of claim 12, wherein the interpreter is further configured to exclude the duplicate CSS rule.

14. The system of claim 12, wherein the interpreter is further configured to exclude the CSS rule that applies to an element outside of a transcluded template.

15. The system of claim 12, wherein the interpreter is further configured to exclude the CSS rule that applies to a transcluded template by a selector external to the transcluded template.

16. The system of claim 12, wherein the interpreter is further configured to exclude the CSS rule that is transcluded by a transcluded template multiple times.

17. The system of claim 12, wherein the interpreter is further configured to exclude the CSS rule that is included in a plurality of transcluded templates.

18. An article of manufacture including a non-transitory computer-readable medium having instructions stored thereon that, when executed by a computing device, cause the computing device to perform operations comprising:

generating a template tree associated with a template file with a parser, the template file including one or more templates;

generating a CSS tree associated with a CSS file with the parser, the CSS file including at least one or more CSS rules;

traversing the template tree and the CSS tree with an optimizer, wherein the traversing further comprises:

for each node in the template tree, identifying a reference to one or more CSS nodes in the CSS tree;

if the reference exists, retrieving a CSS rule from the one or more CSS nodes;

appending the CSS rule to the node in the template tree; and compiling the appended template tree with a compiler.

19. An article of manufacture including a non-transitory computer-readable medium having instructions stored thereon that, when executed by a computing device, cause the computing device to perform operations comprising:

receiving a message requesting a webpage;

collecting one or more CSS rules included in a compiled template tree in a style element, the compiled template tree generated with a parser;

excluding with an optimizer one or more CSS rules from the style element according to a predefined criteria;

inserting the style element in an output stream with a compiler; and sending a response message, the response message including the output stream that is displayed as the webpage.

* * * * *